UNITED STATES PATENT OFFICE.

ALDUS C. HIGGINS AND GEORGE N. JEPPSON, OF WORCESTER, MASSACHUSETTS.

METHOD OF TREATING ELECTRIC-FURNACE PRODUCTS.

944,436.

Specification of Letters Patent.   Patented Dec. 28, 1909.

No Drawing.   Application filed April 23, 1909.   Serial No. 491,728.

*To all whom it may concern:*

Be it known that we, ALDUS C. HIGGINS and GEORGE N. JEPPSON, citizens of the United States, residing at Worcester, in the county of Worcester and State of Massachusetts, have invented certain new and useful Improvements in Methods of Treating Electric-Furnace Products, of which the following is a specification.

This invention relates to the treatment of certain refractory products of electric furnace operations, these products being adapted for use, after bonding, as abrasives, refractories or the like, the object of the invention being the provision of a method of enhancing or improving the bonding qualities of the grains, as well as their adhesive qualities in the preparation of abrasive papers, cloths or the like.

The method is applicable to a variety of electric furnace products, among which may be mentioned silicid of carbon, and the aluminous products resulting from the fusion of commercial bauxite, alumina or aluminous silicates. We have found that by treating such products with an alkaline reagent under suitable conditions as hereinafter described, we are enabled to improve their bonding qualities and thereby to increase very considerably the strength of the bonded articles, or in case of abrasive paper or cloth, the adhesion of the grains.

We may proceed as follows: The electric furnace product, as for example the pig or mass resulting from the fusion of calcined bauxite or other aluminous material, is crushed, preferably but not necessarily to such size or sizes as may be suited for use or for the subsequent manufacture of abrasive implements or articles. The resulting grain is subjected to a dissolved alkaline reagent, the character, concentration and temperature of the solution varying somewhat in accordance with the material to be treated. For treating aluminous abrasive materials we may employ an aqueous solution containing caustic soda or sodium carbonate or preferably a mixture of caustic soda and sodium carbonate, a suitable solution containing 15 pounds of caustic soda and 12 pounds of sodium carbonate dissolved in 50 pounds of water. Satisfactory results are obtained by subjecting the aluminous material to this solution, maintained at or near its boiling point, for a period of from one to two hours. As a modified method of treatment, the aluminous material may be subjected in presence of a small proportion of dry sodium carbonate or sodium hydroxid, or a mixture of these compounds, to a temperature above the melting point of the compound or mixture employed. The alkali in this case acts energetically upon any unconverted or unfused alumina which may be present, but under proper conditions is without substantial action upon the alumina which has undergone fusion in the electric furnace. The amount of alkali employed in this case is preferably approximately proportionate to the percentage of fluxible impurities in the material to be treated. The material treated in accordance with either of the above methods may then be subjected to such further operations as may be required, as washing with water or dilute acid, grinding or crushing, grading, etc., and may then be molded and fired in the usual manner, using any of the customary vitrified, pottery or ceramic bonds, as for example a mixture of clay and feldspar; or a suitably graded material may be directly utilized, or may be applied to the production of articles not requiring firing, as for instance abrasive papers and the like; for this latter use it is found to present particular advantages, the glue or binder adhering to the grain with great tenacity.

The product treated as above is uniform in character, and implements or articles prepared therefrom by bonding, either with or without firing, are found to possess increased strength and durability.

As regards the nature of the effect of the alkaline reagent, it may be suggested, without thereby limiting the invention, that electric furnace products of the character indicated usually contain a small proportion of reduced or segregated impurities, which consist of minute irregularly disseminated particles of reduced metals, alloys, carbids or the like, or of segregated metallic oxids. These are probably attacked by the reagents used, leaving small cavities which receive and retain the glue or other compound. In addition, there is quite probably an action upon the surface of the grain, which is thereby roughened or otherwise better adapted for union with the bond. In the specific case of aluminous products, the alkali attacks or dissolves any unfused or incompletely converted alumina, thereby not only improving the holding quality of the product but also improving the character of the grain. Whatever may be the effect of the treatment upon the grain, the result is a definite and marked increase in the capillary action of the grains. This may be illustrated by placing the dry products, treated and untreated, in open-ended glass tubes, the lower ends of which are immersed in water. It is found that the water rises in the tubes containing the treated material to a much greater height and at a much more rapid rate than in those containing the untreated material. In practice it is found that this test affords a satisfactory indication as to the bonding qualities of the grains.

We claim:

1. The method of improving the bonding qualities of abrasive and refractory materials produced in the electric furnace, which consists in subjecting such materials suitably subdivided, to the action of an alkaline reagent.

2. The method of improving the bonding qualities of artificially prepared aluminous materials which consists in subjecting such materials, suitably subdivided to the action of an alkaline reagent.

In testimony whereof, we affix our signatures in presence of two witnesses.

ALDUS C. HIGGINS.
GEORGE N. JEPPSON.

Witnesses:
ALFRED S. MERRIFIELD,
HENRY DUCKWORTH.